(12) United States Patent
Ren et al.

(10) Patent No.: US 11,602,844 B2
(45) Date of Patent: Mar. 14, 2023

(54) TASK HIERARCHICAL CONTROL METHOD, AND ROBOT AND COMPUTER READABLE STORAGE MEDIUM USING THE SAME

(71) Applicant: UBTECH ROBOTICS CORP LTD, Shenzhen (CN)

(72) Inventors: Xiaoyu Ren, Shenzhen (CN); Liqun Huang, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 105 days.

(21) Appl. No.: 17/192,906

(22) Filed: Mar. 5, 2021

(65) Prior Publication Data

US 2022/0009093 A1 Jan. 13, 2022

(30) Foreign Application Priority Data

Jul. 8, 2020 (CN) .......................... 202010649070.5

(51) Int. Cl.
*B25J 9/16* (2006.01)
*B25J 9/02* (2006.01)
*B25J 13/08* (2006.01)

(52) U.S. Cl.
CPC ............. *B25J 9/1633* (2013.01); *B25J 9/023* (2013.01); *B25J 9/1679* (2013.01); *B25J 13/088* (2013.01)

(58) Field of Classification Search
CPC ........ B25J 9/1643; B25J 9/1679; B25J 9/023; B25J 9/1633; B25J 13/088; G05B 2219/40338
See application file for complete search history.

(56) References Cited

U.S. PATENT DOCUMENTS

| | | | |
|---|---|---|---|
| 7,217,247 B2 * | 5/2007 | Dariush | A63B 21/00181 600/595 |
| 8,874,262 B2 * | 10/2014 | Mistry | G05B 19/00 901/15 |
| 8,924,021 B2 * | 12/2014 | Dariush | G06N 3/008 901/3 |
| 9,186,795 B1 * | 11/2015 | Edsinger | B25J 11/0065 |
| 9,205,887 B2 * | 12/2015 | Dariush | B62D 57/032 |

* cited by examiner

*Primary Examiner* — Khoi H Tran
*Assistant Examiner* — Rodney P King (57) ABSTRACT

A task hierarchical control method as well as a robot and a storage medium using the same are provided. The method includes: obtaining a task instruction for a robot, where the task instruction is for determining a target task card including an amount of selection matrices for dividing a target task into the amount of hierarchical subtasks and a controller name for executing each of the hierarchical subtasks; obtaining a null space projection matrix of each of the hierarchical subtasks based on the corresponding selection matrix; generating control finks of the amount according to the corresponding controller of each of the hierarchical subtasks and the corresponding null space projection matrix; calculating a control torque of each of the control links and obtaining a hierarchical control output quantity by adding ail the control torques; and controlling the robot to perform the target task using the hierarchical control output quantity.

20 Claims, 6 Drawing Sheets

FIG. 1

Erase Blackboard

S1=diag(1,1,0,0); Controller 1 = <Cartesian Impedance Controller>

S2=diag(0,0,1,0); Controller 2 = <Direct Force Controller>

S3=diag(0,0,0,1); Controller 3 = <Joint Impedance Controller>

TASK HIERARCHICAL CONTROL METHOD, AND ROBOT AND COMPUTER READABLE STORAGE MEDIUM USING THE SAME

CROSS REFERENCE TO RELATED APPLICATIONS

The present disclosure claims priority to Chinese Patent Application No. 202010649070.5, filed Jul. 8, 2020, which is hereby incorporated by reference herein as if set forth in its entirety.

BACKGROUND

1. Technical Field

The present disclosure relates to robot control technology, and particularly to a task hierarchical control method as well as a robot and a computer readable storage medium using the same.

2. Description of Related Art

A robot with a plurality of degree-of-freedom can perform a plurality of tasks simultaneously except when it is located in a special position (e.g., singular position). Taking a robotic arm with seven degree-of-freedom as an example, it can maintain seven joints with a certain degree of impedance during performing a primary task such as erasing blackboard. In the existing control method, the control signals for the two tasks of the controls for erasing blackboard and maintaining joint impedance are often superimposed through, for example, the most commonly used method such as direct superposition.

However, the direct superposition method will easily cause mutual interference between the controls of different tasks. Furthermore, when there are a plurality of tasks, it needs to determine the controller or control method of each task first, and then perform dynamics decomposition. When the task is to be changed, it needs to re-determine the controller or control method of each task, then re-perform dynamics decomposition, and the overall process is cumbersome.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

Generally, the components in the embodiments of the present disclosure that are described and shown in the drawings may be arranged and designed in various different configurations. Therefore, the following detailed descriptions for the embodiments of the present disclosure are not intended to limit the scope of the present disclosure, but merely represents the selected embodiments of the present disclosure. Based on the embodiments of the present disclosure, all other embodiments obtained by those skilled in the art without creative work shall fall within the scope of the present disclosure.

Hereinafter, the terms "including", "having" and their cognates that are used in the embodiments of the present disclosure are only intended to represent specific features, numbers, steps, operations, elements, components, or combinations of the foregoing, and should not be understood as first excluding the possibility to have one or more other features, numbers, steps, operations, elements, components, or combinations of the foregoing or add one or more features, numbers, steps, operations, elements, components, or combinations of the foregoing.

In addition, the terms "first", "second", "third", and the like in the descriptions are only used for distinguishing, and cannot be understood as indicating or implying relative importance.

Unless otherwise defined, all terms (including technical and scientific terms) used herein have the same meanings as commonly understood by those skilled in the art of the embodiments of the present disclosure. The terms (e.g., those defined in commonly used dictionaries) will be interpreted as having the same meaning as the contextual meaning in the related technology and should not be interpreted as having idealized or overly formal meanings, unless clearly defined in the embodiments of the present disclosure.

Embodiment 1

Figure 1:
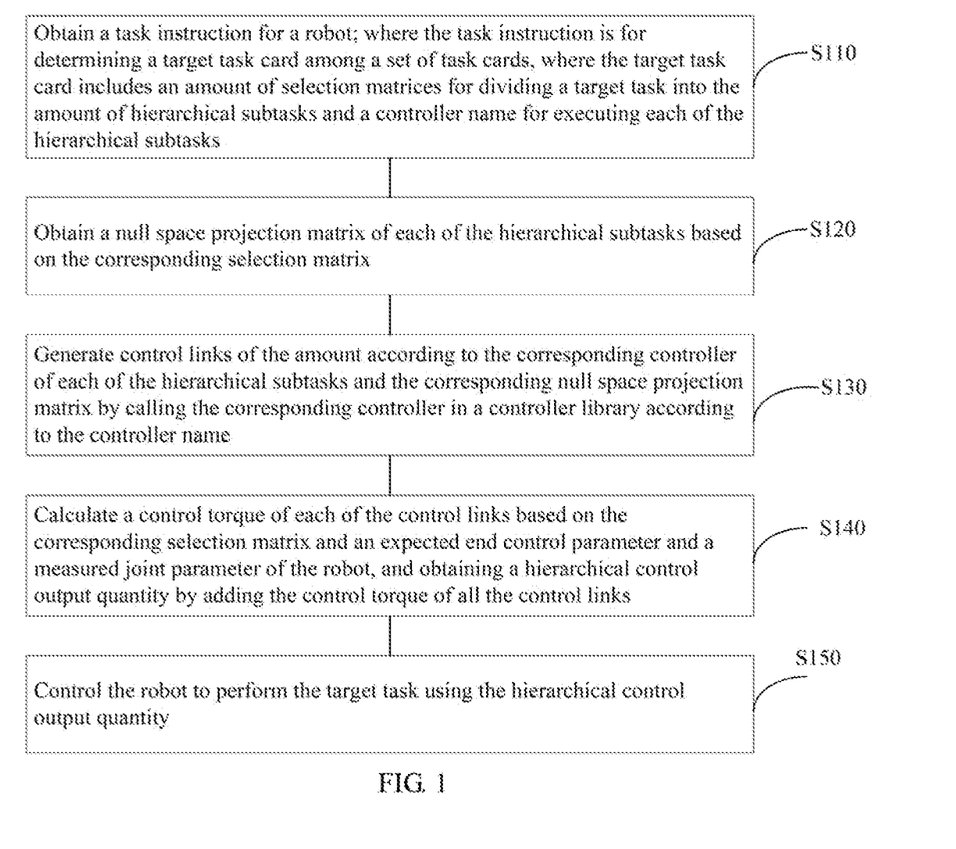
FIG. 1 is a flow chart of an embodiment of a task hierarchical control method according to the present disclosure.

FIG. 1 is a flow chart of an embodiment of a task hierarchical control method according to the present disclosure. In this embodiment, a task hierarchical control method is provided. The task hierarchical control method is a computer-implemented method executable for a processor. The method can be applied to a robot or a robotic arm with a plurality of redundant degree-of-freedom, where the robot can perform a plurality of tasks at the same time. In the case of performing a plurality of tasks, the tasks can be performed simultaneously in a priority order through the task hierarchical control method, and there will be no mutual interference between the tasks. In this embodiment, the robot (or the robotic arm) includes limb(s) (e.g., link(s)) and joint(s) connected to the limb(s). The method may be implemented through a task hierarchical control apparatus shown in FIG. 5 or FIG. 6. As shown in FIG. 1, the method includes the following steps.

S110: obtaining a task instruction for the robot; where the task instruction is for determining a target task card among a set of task cards, where the target task card includes an amount of selection matrices for dividing a target task into the amount of hierarchical subtasks and a controller name for executing each of the hierarchical subtasks.

The task instruction is for informing the robot about the task(s) to be performed, for example, erasing blackboard, sweeping, drawing circles, or walking. It should be noted that, the tasks are not limited to those listed above, and can be defined according to actual needs.

The above-mentioned tasks may need to meet different requirements in different directions or joints in the process of being performed. Taking the task of erasing blackboard as an example, in a Cartesian space of an end (e.g., an effector) of (a limb of) the robot, the blackboard eraser at the end needs to produce a Cartesian impedance control in the X and Y directions and a direct force control effect in the Z direction. In addition, it is also necessary to produce an impedance effect on the joint(s) to ensure safety and smoothness.

Hence, in this embodiment, the subtasks are performed in a hierarchical manner, that is, when executing the task, each requirement is regarded as a corresponding subtask and executed individually. As an example, the target task to be executed may be divided into subtasks of different hierarchies in a priority order according to different needs in advance. For example, the subtask of the first hierarchy is to be executed first, then the subtask of the second hierarchy is to be executed, and the subtask of the third hierarchy is to be executed last.

Each hierarchy of the subtasks need to be divided using its corresponding selection matrix, that is, different selection matrices are used to select the task direction of each subtask in the Cartesian space of the end of the robot, so that the corresponding subtask can be executed in its task direction. As an example, in each of the above-mentioned selection matrices, each column vector is orthogonal to the other, and the norm of the non-zero column is 1. The selection matrix is a matrix with the size of n×k, where n is the degree-of-freedom of the robot, k is the dimension of the task selected through the selection matrix.

In some embodiments, a task may be described using a task card. As an example, a task card set including a plurality of task cards may be built, where each task card represents one task. When the task instruction is obtained, the corresponding task card can be found according to the task instruction, and then the task can be performed according to information in the task card.

As an example, each of the task cards includes information of a plurality of hierarchical subtasks each having a priority order, where the information of each of the hierarchical subtasks includes the corresponding selection matrix for dividing the target task into the corresponding hierarchical subtask and the controller name for executing the corresponding hierarchical subtask. It should be noted that, the task card includes only name information of the controller, and the corresponding controller can be called from a controller library through the controller name.

Figure 2:
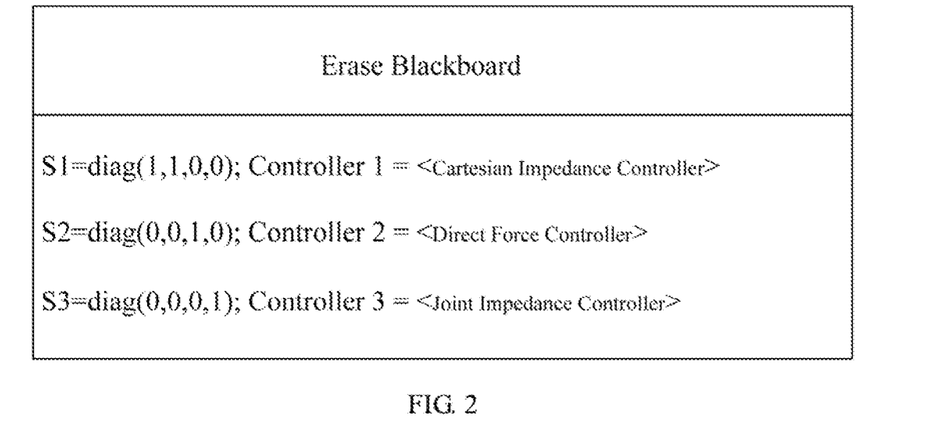
FIG. 2 is a flow chart of a task card for erasing blackboard in the task hierarchical control method of FIG. 1.

FIG. 2 is a flow chart of a task card for erasing blackboard in the task hierarchical control method of FIG. 1. As shown in FIG. 2, in the case that a robotic arm with four degree-of-freedom is used to perform a task of erasing blackboard, the information in the task card for erasing blackboard includes three selection matrices of $$S_1 = \begin{bmatrix} 1 & 0 \\ 0 & 1 \\ 0 & 0 \\ 0 & 0 \end{bmatrix}, S_2 = \begin{bmatrix} 0 \\ 0 \\ 1 \\ 0 \end{bmatrix}, \text{ and } S_3 = \begin{bmatrix} 0 \\ 0 \\ 0 \\ 1 \end{bmatrix}$$

as well as the controller name of a cartesian impedance controller for performing the first hierarchical subtasks, a direct force feedback controller for performing the second hierarchical subtasks, and a joint impedance controller for performing the third hierarchical subtasks that are for the hierarchical subtasks of different hierarchies. It can be understood that, the three selection matrices represent that the task of erasing blackboard is divided into three hierarchical subtasks. In addition, in the task card, the three subtasks are stored in an order from high priority to low priority, that is, the hierarchical subtask corresponding to the selection matrix S1 has the highest priority. In other embodiments, the information of the hierarchical subtask may be stored in other orders, which is not limited herein.

It should be noted that, for the task cards in the task card set, operations such as deletion, addition, or modification can be performed according to actual needs. For example, if a newly added target task does not exist in the task card set, it may be described in the form of the above-mentioned task cards and added to the task card set.

In this embodiment, in order to prevent subtasks from interfering with each other and ensure that each subtask can be performed completely, the null space projection matrix of each hierarchical subtask will be solved using the corresponding selection matrix, and the hierarchical subtasks will be made to perform in the order from high priority to low priority through null space projection.

S120: obtaining a null space projection matrix of each of the hierarchical subtasks based on the corresponding selection matrix.

In some embodiments, the null space projection matrix of each of the hierarchical subtask may be calculated based on the corresponding selection matrix of the hierarchical subtask and a Jacobian matrix of the robot. As an example, it can be calculated through the equations of:

$$N_I = I - J_{I-1}^{augT}(J_{I-1}^{aug\#})^T, i \geq 2, N_I = I;$$

$$J_k = S_k^T J, J_I^{aug} = \begin{bmatrix} J_{i-1}^{aug} \\ J_k \end{bmatrix}; \text{ and}$$

$$J_I^{aug\#} = M^{-1} J_I^{augT}(J_I^{aug} B^{-1} J_i^{augT})^{-1};$$

where, $N_1$ is the null space projection matrix of the i-th hierarchical subtask and i≥2, the null space projection matrix of the 1st hierarchical subtask is an identity matrix I; J is the Jacobian matrix of the robot from a base to an end of the robot; and $S_k$ and $J_k$ are the selection matrix of the k-th hierarchical subtask and the corresponding Jacobian matrix, respectively, $J_1^{avgT}$ and $J_1^{avg\#}$ are the transposition and pseudoinverse of a transition matrix $J_1^{avg}$, respectively, M is an expected mass of the robot, and B is an inertia matrix of the robot.

It can be understood that, the Jacobian matrix corresponding to the corresponding hierarchical subtask can be determined by multiplying the corresponding selection matrix and the Jacobian matrix J. If the number of rows of the Jacobian matrix J is less than the degree-of-freedom n, it needs to be expanded to n rows, while the expanded rows can only be used as the hierarchical subtask of the lowest hierarchy.

For example, as mentioned above, in the case that a robotic arm with four degree-of-freedom is used to perform a task of erasing blackboard, the selection matrices are S1, S2, and S3. According to the above-mentioned equations, the null space projection matrix $N_1$ corresponding to the first hierarchical subtask is the identity matrix I, the null space projection matrix $N_2$ corresponding to the second hierarchical subtask is $1-J_1^{avgT}(J_1^{avg\#})^T$, and the null space projection matrix $N_3$ corresponding to the third-hierarchical subtask is $1-J_2^{avgT}(J_2^{avg\#})^T$, where the above-mentioned $J_1^{avg}$ and $J_2^{avg}$ can be calculated based on the above-mentioned equations.

In this embodiment, in order to facilitate the modification or replacement of control algorithms for different tasks without corresponding adjustments to the overall control codes or process, a controller library will be built, where various general purpose or standard controllers will be stored therein. As an example, the controllers may include but is not limited to one or more of a Cartesian impedance controller, direct force feedback controller, a joint impedance controller, a motion controller, and combination(s) thereof. In addition, other customized controllers may also be added.

It can be understood that, the internal structure of each controller is not limited herein, which can be designed according to actual needs. But it should be noted that, the name of the controllers stored in the controller library and the controller name in the task cards should be consistent so that the controllers can be called normally.

S130: generating control links of the amount according to the corresponding controller of each of the hierarchical subtasks and the corresponding null space projection matrix by calling the corresponding controller in a controller library according to the controller name.

As an example, the corresponding controller may be called based on the controller name corresponding to each hierarchical subtask, and then a number of parallel control links (see FIG. 3) equivalent to the number of the hierarchical subtasks may be generated based on the null space projection matrix and the controller that correspond to the hierarchical subtask. In which, the control circuit refers to the independent control loop of each hierarchy of the hierarchical subtasks. The control loops of the hierarchical subtasks are connected in parallel to compose a hierarchical controller for all the hierarchical subtasks, that is, a multi-task controller. A corresponding amount of the control links are generated according to the amount of hierarchies of the hierarchical subtasks in the task card. Each control line is composed of the controller and null space projection matrix of the corresponding hierarchy that are connected in series.

S140: calculating a control torque of each of the control links based on the corresponding selection matrix and an expected end control parameter and a measured joint parameter of the robot, and obtaining a hierarchical control output quantity by adding the control torque of all the control links.

For each control link, the expected end control parameters and measured joint parameters of the robot are used as the input parameters of the controller in the control link, and the corresponding control torque is calculated by the controller. Finally, the sum of the control torques of all the control links is used as the control output torque, that is, the above-mentioned hierarchical control output quantity, required by each joint of the robot.

As an example, the above-mentioned expected end control parameters may include an expected force acting on the end of the robot, an expected displacement (also called expected trajectory) of the end, and an expected speed and/or an expected acceleration of the end, which can be obtained by pre-planning the robot. In order to control the robot more accurately, the state of each joint of the robot is usually measured in real time and fed back to the controller, so as to use the expected value and the actual value jointly to calculate the control output of the controller. As an example, the measured parameters of each joint of the robot may include a joint angle, a joint angular velocity, and a joint angular acceleration of the joint as well as an external force and external torque acting on the joint. It can be understood that, some of these joint parameters can be measured through corresponding sensors directly, while some of them can be obtained after further processing the measured values.

Figure 3:
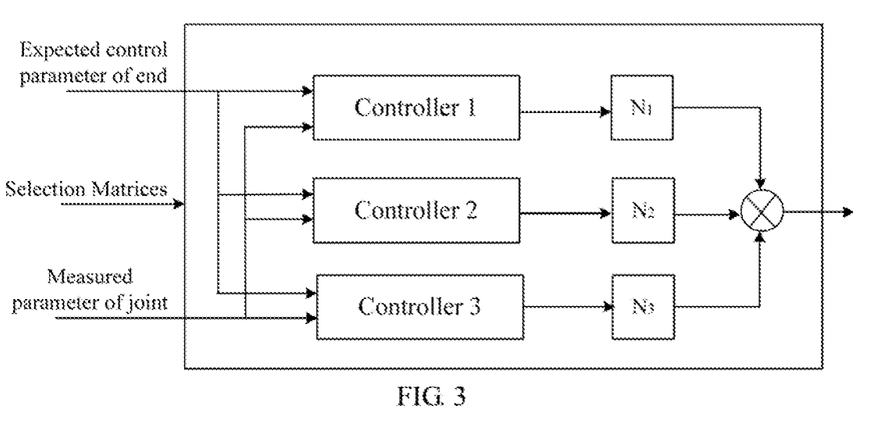
FIG. 3 is a schematic block diagram of using the task hierarchical control method of FIG. 1 in the hierarchical control of a task of erasing blackboard.

FIG. 3 is a schematic block diagram of using the task hierarchical control method of FIG. 1 in the hierarchical control of a task of erasing blackboard. As shown in FIG. 3, taking the above-mentioned three hierarchical subtasks of erasing blackboard as an example, each control link includes a corresponding controller (e.g., controller 1) and a null space projection matrix (e.g., $N_1$). It should be noted that, when calculating the control torque, each controller will use the corresponding selection matrix to select the task direction of the robot in the Cartesian space, so that the above-mentioned input parameters are projected into the corresponding task space for calculation. Each null space projection matrix is used to perform null space projection on the (hierarchical control) output quantity of each controller, that is, projecting the output quantities of the controllers through null space and then add them up, so that the tasks can be performed in the priority order.

S150: controlling the robot to perform the target task using the hierarchical control output quantity.

As an example, after the added up hierarchical control output quantity of all the control links is calculated, it is used as the control output torque required by each joint of the robot, and then transmitted to the servo of the joint of the robot for torque control, so that the robot eventually perform the target task according to preset requirements.

In this embodiment, the task hierarchical control method hierarchizes a task into subtasks and describes the task in the form of task card. At the same time, selection matrices are used to calculate a null space projection matrix of each hierarchy of subtasks and build a controller library to be called by different controllers. In this manner, a plurality of tasks can be implemented hierarchically simultaneously, and the tasks will not interfere with each other. In addition, by using task cards and calling through controllers, the task control algorithm can be modified or replaced easily when the task is to be changed or expanded. In comparison with the existing multi-task technical solutions, it does not need to perform dynamics decomposition whenever the task is changed, which greatly reduces the cycle and process of development.

Embodiment 2

Figure 4:
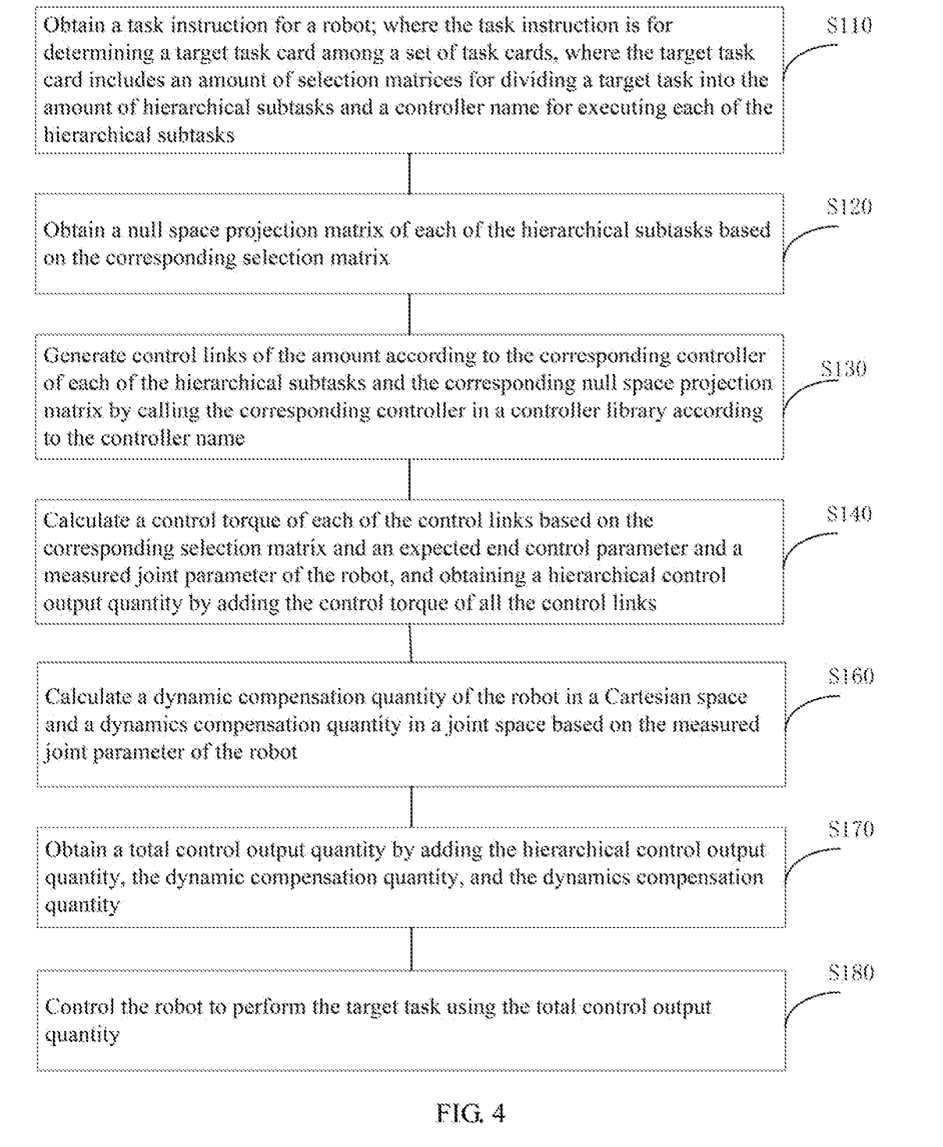
FIG. 4 is a flow chart of another embodiment of a task hierarchical control method according to the present disclosure.

FIG. 4 is a flow chart of another embodiment of a task hierarchical control method according to the present disclosure.

In this embodiment, another task hierarchical control method is provided. The difference from this task hierarchical control method and that of embodiment 1 is that, the task hierarchical control method further includes: a dynamic compensation in the Cartesian space of the robot and a real-time compensation in the joint space of the robot are performing on the basis of hierarchical control output quantity so as to achieve more accurate torque control, and so on.

The task hierarchical control method is mainly for a robotic arm controlled through torque, that is, a force-controlled robotic arm. For the force-controlled robotic arm, the output force can be controlled directly, which has faster response speed and better safety, and can better meet the needs of safety, smoothness, and the like. However, when controlling the force-controlled robotic arm, the full dynamics of the robot needs to be considered. Therefore, its control is more complicated and has lower linearity. For this reason, in this embodiment, the non-linearity of control will be reduced by using dynamics compensation, and effectively simplify the control of the force-controlled robot.

In this embodiment, after step S140, this task hierarchical control method further includes the following steps.

S160: calculating a dynamic compensation quantity of the robot in a Cartesian space and a dynamics compensation quantity in a joint space based on the measured joint parameter of the robot.

As an example, the compensation quantities mainly divided into two parts of dynamic compensation quantities of the robot in the Cartesian space and the dynamics compensation quantities of the robot in the joint space. It should be noted that, in other embodiments, the compensation quantities may also be composed of one of the two.

In some embodiments, the dynamic compensation quantity of the robot in the Cartesian space includes two compensation components, namely a first compensation component and a second compensation component. As an example, calculating the dynamic compensation quantity of the robot in the Cartesian space based on the measured joint parameter of the robot includes:

calculating the first compensation component based on the Jacobian matrix of the robot from a base to an end of the robot and the external torque acting on each joint; calculating the second compensation component based on an inertia matrix of the robot, the Jacobian matrix, and the angular velocity of each joint; and adding the first compensation component and the second compensation component to obtain the dynamic compensation quantity.

As an example, the above-mentioned first compensation component $\tau_1$ and second compensation component $\tau_2$ can be calculated through the equations of:

$$\tau_1 = J^T J^{T\#} \tau_{ext}; \text{ and}$$

$$\tau_2 = BJ^{\#} \dot{J} \dot{q}.$$

where, J is the Jacobian matrix of the robot from a base to an end of the robot; $J^T$ and $J^{\#}$ are the transposition and pseudoinverse of the Jacobian matrix J, respectively, $J^{T\#}$ is the inverse of the transposition of the Jacobian matrix J, $\dot{J}$ is the derivation of the Jacobian matrix J, $\tau_{ext}$ is the external torque acting on each joint of the robot, $\dot{q}$ is the angular velocity of each joint of the robot, and B is an inertia matrix of the robot.

In some embodiments, the dynamics compensation quantity of the robot in the joint space includes a centrifugal force and Coriolis force item and a gravity item. As an example, the dynamic compensation quantity is:

$$\tau_3 = C(q, \dot{q})\dot{q} + G(q);$$

where, $C(q,\dot{q})$ is the centrifugal force and Coriolis force matrix which can be calculated through a joint angle q and a joint angular velocity $\dot{q}$ of each joint of the robot, G(q) is the gravity vector composed of gravity components acting on each link of the robot that is coupled to the joint.

S170: obtaining a total control output quantity by adding the hierarchical control output quantity, the dynamic compensation quantity, and the dynamics compensation quantity.

It should be noted that, in this embodiment, the control output quantity further includes the above-mentioned two compensation quantities. As an example, the hierarchical control output quantity calculated in step S140 is added with the two compensation quantities calculated in step S160, the sum of the addition is used as the total control output quantity, and eventually step S180 is executed.

S180: controlling the robot to perform the target task using the total control output quantity.

Step S180 is similar to the above-mentioned step S150, and will not be described in detail herein.

Embodiment 3

Figure 5:
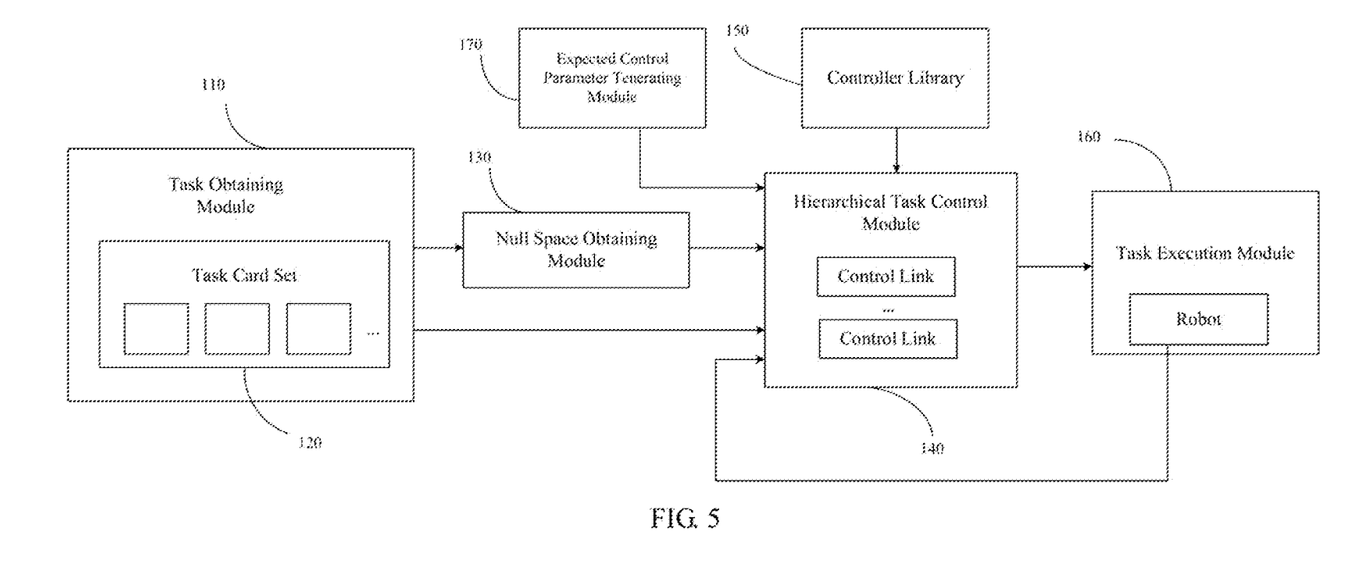
FIG. 5 is a schematic block diagram of an embodiment of a task hierarchical control apparatus according to the present disclosure.

FIG. 5 is a schematic block diagram of an embodiment of a task hierarchical control apparatus according to the present disclosure. As shown in FIG. 5, in this embodiment, a task hierarchical control apparatus 10 for controlling a robot is provided based on the task hierarchical control method of the foregoing embodiment 1. As an example, the task hierarchical control apparatus 10 includes: a task obtaining module 110, a task card set 120, a null space obtaining module 130, a hierarchical task control module 140, a controller library 150, and a task execution module 160.

The task obtaining module 110 is configured to obtain a task instruction for the robot; where the task instruction is for determining a target task card in the task card set 120, where the target task card includes an amount of selection matrices for dividing a target task into the amount of hierarchical subtasks and a controller name for executing each of the hierarchical subtask.

The null space obtaining module 130 is configured to obtain a null space projection matrix of each of the hierarchical subtasks based on the corresponding selection matrix.

The hierarchical task control module 140 is configured to generate control links of the amount according to the corresponding controller of each of the hierarchical subtasks and the corresponding null space projection matrix by calling the corresponding controller in a controller library according to the controller name.

The hierarchical task control module 140 is further configured to calculate a control torque of each of the control links based on the corresponding selection matrix and an expected end control parameter and a measured joint parameter of the robot, and obtain a hierarchical control output quantity by adding the control torque of all the control links.

In which, the expected control parameter for the end of the robot can be output by an expected control parameter generating module 170 which is mainly configured to generate an expected force and expected position for each discrete time period required to perform the above-mentioned target task. The measured parameters related to the joints can be measured and calculated by related sensors installed on the robot.

The task execution module 160 is configured to control the robot to perform the target task using the hierarchical control output quantity.

Figure 6:
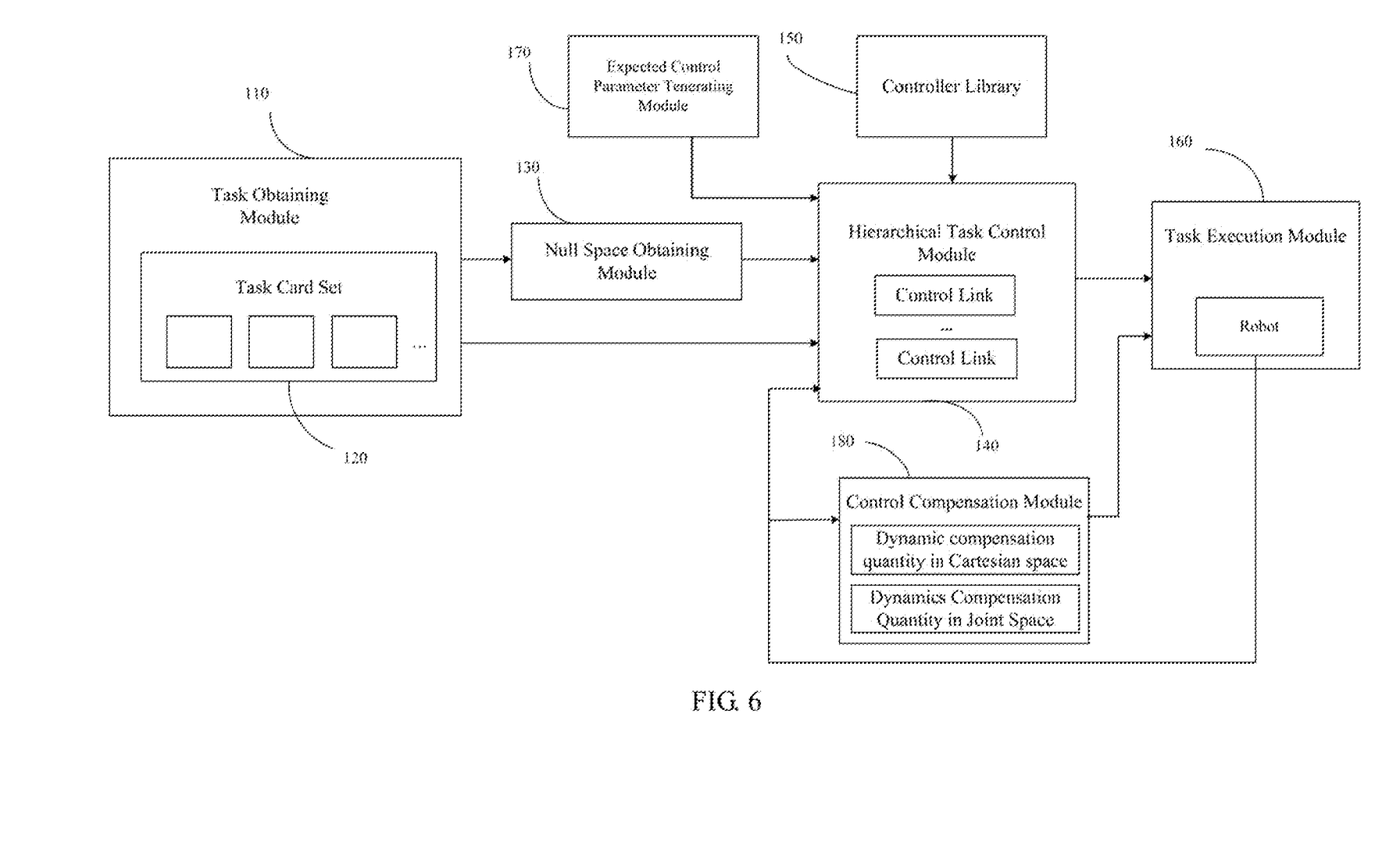
FIG. 6 is a schematic block diagram of another embodiment of a task hierarchical control apparatus according to the present disclosure.

FIG. 6 is a schematic block diagram of another embodiment of a task hierarchical control apparatus according to the present disclosure. As shown in FIG. 6, in some embodiments, the task hierarchical control apparatus 10 further includes:

a control compensation module 180 configured to calculate a dynamic compensation quantity of the robot in a Cartesian space and a dynamics compensation quantity in a joint space based on the measured joint parameter of the robot.

As an example, the control compensation module 180 includes two compensation items, namely, the dynamic compensation quantity in the Cartesian space and the dynamic compensation quantity in the joint space.

The task execution module 160 is further configured to obtain a total control output quantity by adding the hierarchical control output quantity, the dynamic compensation quantity, and the dynamics compensation quantity, and control the robot to perform the target task using the total control output quantity.

It can be understood that, the above-mentioned task hierarchical control apparatus 10 corresponds to the task hierarchical control method of embodiment 1 or 2. Any optional function in embodiment 1 or 2 is also applicable to this embodiment, and will not be described in detail herein.

The present disclosure further provides a robot including a processor and a storage, where the storage (e.g., a memory) stores a computer program, and the processor is configured to execute the computer program to implement the task hierarchical control method of the above-mentioned embodiment 1 or 2, or the function of the modules in the task hierarchical control apparatus of the above-mentioned embodiment 3. As an example, the robot may be any robot such as a cutting robot, a welding robot, a grinding robot, and a massage robot.

The present disclosure further provides a non-transitory computer-readable storage medium storing a computer program, and the above-mentioned task hierarchical control method or the functions of the modules in the task hierarchical control apparatus are implemented when the computer program is executed.

In the embodiments provided in the present disclosure, it should be noted that, the disclosed device (apparatus)s and method may also be implemented in other manners. The device embodiments described above-mentioned are only schematic. For example, the flowcharts and schematic diagrams in the drawings show the possible architectures, functions, and operations according to the devices, methods, and computer program products of the embodiments of the present disclosure. In this regard, each block in the flowchart or block diagram may represent a module, program segment, or part of codes, and the module, program segment, or part of codes contains one or more executable instructions for realizing the specified logic functions. It should also be noted that, in alternative implementations, the functions marked in the blocks may also execute in a different order from the order marked in the drawings. For example, two consecutive blocks can actually be executed basically in parallel, or they can sometimes be executed in the reverse order, depending on the functions involved. It should also be noted that, each block in the schematic diagram and/or flowchart and the combination of the blocks in the schematic diagram and/or flowchart can be realized using a dedicated hardware-based device that executes specified functions or actions, or be realized using a combination of the dedicated hardware and computer instructions.

In addition, the functional modules or units in each embodiment of the present disclosure may be integrated together to form an independent part, or each module or unit may exist alone, or two or more modules or units may be integrated to form an independent part.

In the case that function(s) are implemented in the form of a software functional unit and sold or utilized as a separate product, they can be stored in a non-transitory computer readable storage medium. Based on this understanding, the technical solution of the present disclosure, either essentially or in part, contributes to the prior art, or a part of the technical solution can be embodied in the form of a software product. The software product is stored in a storage medium, which includes a plurality of instructions for enabling a computer device (which can be a smart phone, a personal computer, a server, a network device, or the like) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, changes or replacements that can be easily conceived within the technical scope of the present disclosure should be included within the scope of the present disclosure.

What is claimed is:

1. A computer-implemented task hierarchical control method for a robot, comprising steps of:
   obtaining a task instruction for the robot, and determining a target task card among a set of task cards according to the task instruction, wherein the target task card comprises a first amount of selection matrices for dividing a target task into the first amount of hierarchical subtasks, and a controller name for executing each of the hierarchical subtasks, and wherein each of the selection matrices is a matrix with a size of n×k, where n is a degree of freedom of the robot, and k is a dimension of a task selected through a selection matrix;
   obtaining a null space projection matrix of each of the hierarchical subtasks based on the corresponding selection matrix;
   generating control links of the first amount according to the corresponding controller of each of the hierarchical subtasks and the corresponding null space projection matrix by calling the corresponding controller in a controller library according to the controller name;
   calculating a control torque of each of the control links based on the corresponding selection matrix and an expected end control parameter and a measured joint parameter of the robot, and obtaining a hierarchical control output quantity by adding the control torque of all the control links; and
   controlling the robot to perform the target task using the hierarchical control output quantity.

2. The method of claim 1, further comprising:
   calculating a dynamic compensation quantity of the robot in a Cartesian space and a dynamics compensation quantity in a joint space based on the measured joint parameter of the robot;
   obtaining a total control output quantity by adding the hierarchical control output quantity, the dynamic compensation quantity, and the dynamics compensation quantity; and controlling the robot to perform the target task using the total control output quantity.

3. The method of claim 2, wherein the dynamic compensation quantity of the robot in the Cartesian space comprises a first compensation component and a second compensation component, and the measured joint parameter comprises an angular velocity of each joint of the robot and an external torque acting on the joint; wherein the step of calculating the dynamic compensation quantity of the robot in the Cartesian space based on the measured joint parameter of the robot comprises:

calculating the first compensation component based on the Jacobian matrix of the robot from a base to an end of the robot and the external torque acting on each joint;

calculating the second compensation component based on an inertia matrix of the robot, the Jacobian matrix, and the angular velocity of each joint; and adding the first compensation component and the second compensation component to obtain the dynamic compensation quantity.

4. The method of claim 2, wherein the dynamics compensation quantity of the robot in the joint space comprises a centrifugal force and Coriolis force item and a gravity item; wherein the centrifugal force and Coriolis force item is calculated based on an angle and an angular velocity of each joint of the robot, and the gravity item is composed of a gravity acting on each link of the robot coupled to the joint.

5. The method of claim 1, wherein the set of task cards comprises a plurality of task cards comprising the target task card; wherein each of the task cards comprises information of a plurality of hierarchical subtasks with a priority order, the information of each of the hierarchical subtasks comprises the corresponding selection matrix for dividing the target task into the corresponding hierarchical subtask and the controller name for executing the corresponding hierarchical subtask;

wherein the hierarchical subtasks with the priority order are obtained by dividing a task to be executed according to different requirements that the task to be executed needs to meet in different directions or joints in advance; and wherein different selection matrices are configured to select a task direction of each of the hierarchical subtasks in a Cartesian space of an end of the robot.

6. The method of claim 1, wherein the step of obtaining the null space projection matrix of each of the hierarchical subtasks based on the corresponding selection matrix comprises:

calculating the null space projection matrix of the corresponding hierarchical subtask based on the corresponding selection matrix of the corresponding hierarchical subtask and a Jacobian matrix of the robot through equations of:

$$N_I = I - J_{I-1}^{augT}(J_{I-1}^{aug\#})^T, i \geq 2, N_I = I;$$

$$J_k = S_k^T J, J_I^{aug} = \begin{bmatrix} J_{i-1}^{aug} \\ J_k \end{bmatrix}; \text{ and}$$

$$J_I^{aug\#} = M^{-1} J_I^{augT}(J_I^{aug} B^{-1} J_i^{augT})^{-1};$$

where, $N_1$ is the null space projection matrix of the i-th hierarchical subtask and i≥2, the null space projection matrix of the 1st hierarchical subtask is an identity matrix I; J is the Jacobian matrix of the robot from a base to an end of the robot; and $S_k$ and $J_k$ are the selection matrix of the k-th hierarchical subtask and the corresponding Jacobian matrix, respectively, $J_1^{avgT}$ and $J_1^{avg\#}$ are the transposition and pseudoinverse of a transition matrix $J_1^{avg}$, respectively, M is an expected mass of the robot, and B is an inertia matrix of the robot;

wherein when a number of rows of the Jacobian matrix J is less than the degree of freedom n, the Jacobian matrix J is expanded to n rows, and the expanded rows are used as a hierarchical subtask of a lowest hierarchy; and wherein in each of the selection matrices, each column vector is orthogonal to the other, and a norm of the non-zero column is 1.

7. The method of claim 1, wherein the control links of the first amount are connected in parallel; and wherein the method further comprises:

building the controller library storing one or more of a Cartesian impedance controller, a direct force feedback controller, a joint impedance controller, a motion controller, and at least one customized controller.

8. The method of claim 1, wherein each of the control links comprises the corresponding controller and the corresponding null space projection matrix, and the step of calculating the control torque of each of the control links based on the corresponding selection matrix and the expected end control parameter and the measured joint parameter of the robot, and obtaining the hierarchical control output quantity by adding the control torque of all the control links comprises:

calculating, through the each corresponding controller, the control torque of each of the control links, by selecting a task direction of the robot in a Cartesian space using the each corresponding selection matrix and projecting the expected end control parameter and the measured joint parameter of the robot into each corresponding task space;

performing, through the each corresponding null space projection matrix, a null space projection on an output quantity of the each corresponding controller; and obtaining the hierarchical control output quantity by adding the projected output quantity of the each corresponding controller.

9. A robot, comprising:

a processor;

a memory coupled to the processor; and one or more computer programs stored in the memory and executable on the processor;

wherein, the one or more computer programs comprise:

instructions for obtaining a task instruction for the robot, and determining a target task card among a set of task cards according to the task instruction, wherein the target task card comprises a first amount of selection matrices for dividing a target task into the first amount of hierarchical subtasks and a controller name for executing each of the hierarchical subtasks, and wherein each of the selection matrices is a matrix with a size of n×k, where n is a degree of freedom of the robot, and k is a dimension of a task selected through a selection matrix;

instructions for obtaining a null space projection matrix of each of the hierarchical subtasks based on the corresponding selection matrix;

instructions for generating control links of the first amount according to the corresponding controller of each of the hierarchical subtasks and the corresponding null space projection matrix by calling the corresponding controller in a controller library according to the controller name;

instructions for calculating a control torque of each of the control links based on the corresponding selection matrix and an expected end control parameter and a measured joint parameter of the robot, and obtaining a hierarchical control output quantity by adding the control torque of all the control links; and instructions for controlling the robot to perform the target task using the hierarchical control output quantity.

10. The robot of claim 9, wherein the one or more computer programs further comprise:

instructions for calculating a dynamic compensation quantity of the robot in a Cartesian space and a dynamics compensation quantity in a joint space based on the measured joint parameter of the robot;

instructions for obtaining a total control output quantity by adding the hierarchical control output quantity, the dynamic compensation quantity, and the dynamics compensation quantity; and instructions for controlling the robot to perform the target task using the total control output quantity.

11. The robot of claim 10, wherein the dynamic compensation quantity of the robot in the Cartesian space comprises a first compensation component and a second compensation component, and the measured joint parameter comprises an angular velocity of each joint of the robot and an external torque acting on the joint; wherein the instructions for calculating the dynamic compensation quantity of the robot in the Cartesian space based on the measured joint parameter of the robot comprise:

instructions for calculating the first compensation component based on the Jacobian matrix of the robot from a base to an end of the robot and the external torque acting on each joint;

instructions for calculating the second compensation component based on an inertia matrix of the robot, the Jacobian matrix, and the angular velocity of each joint; and instructions for adding the first compensation component and the second compensation component to obtain the dynamic compensation quantity.

12. The robot of claim 10, wherein the dynamics compensation quantity of the robot in the joint space comprises a centrifugal force and Coriolis force item and a gravity item; wherein the centrifugal force and Coriolis force item is calculated based on an angle and an angular velocity of each joint of the robot, and the gravity item is composed of a gravity component acting on each link of the robot coupled to the joint.

13. The robot of claim 9, wherein the set of task cards comprises a plurality of task cards comprising the target task card; wherein each of the task cards comprises information of a plurality of hierarchical subtasks with a priority order, the information of each of the hierarchical subtasks comprises the corresponding selection matrix for dividing the target task into the corresponding hierarchical subtask and the controller name for executing the corresponding hierarchical subtask;

wherein the hierarchical subtasks with the priority order are obtained by dividing a task to be executed according to different requirements that the task to be executed needs to meet in different directions or joints in advance; and wherein different selection matrices are configured to select a task direction of each of the hierarchical subtasks in a Cartesian space of an end of the robot.

14. The robot of claim 9, wherein the instructions for obtaining the null space projection matrix of each of the hierarchical subtasks based on the corresponding selection matrix comprise:

instructions for calculating the null space projection matrix of the corresponding hierarchical subtask based on the corresponding selection matrix of the corresponding hierarchical subtask and a Jacobian matrix of the robot through equations of:

$$N_I = I - J_{I-1}^{uagT}\left(J_{I-1}^{aug\#}\right)^T, i \geq 2, N_I = I;$$

$$J_k = S_k^T J, J_I^{aug} = \begin{bmatrix} J_{i-1}^{aug} \\ J_k \end{bmatrix}; \text{ and}$$

$$J_I^{aug\#} = M^{-1} J_I^{augT}\left(J_I^{aug} B^{-1} J_i^{augT}\right)^{-1};$$

where, $N_1$ is the null space projection matrix of the i-th hierarchical subtask and i≥2, the null space projection matrix of the 1st hierarchical subtask is an identity matrix I; J is the Jacobian matrix of the robot from a base to an end of the robot; and $S_k$ and $J_k$ are the selection matrix of the k-th hierarchical subtask and the corresponding Jacobian matrix, respectively, $J_1^{avgT}$ and $J_1^{avg\#}$ are the transposition and pseudoinverse of a transition matrix $J_1^{avg}$, respectively, M is an expected mass of the robot, and B is an inertia matrix of the robot;

wherein when a number of rows of the Jacobian matrix J is less than the degree of freedom n, the Jacobian matrix J is expanded to n rows, and the expanded rows are used as a hierarchical subtask of a lowest hierarchy; and wherein in each of the selection matrices, each column vector is orthogonal to the other, and a norm of the non-zero column is 1.

15. A non-transitory computer readable storage medium for storing one or more computer programs, wherein the one or more computer programs comprise:

instructions for obtaining a task instruction for the robot, and determining a target task card among a set of task cards according to the task instruction, wherein the target task card comprises a first amount of selection matrices for dividing a target task into the first amount of hierarchical subtasks and a controller name for executing each of the hierarchical subtasks, and wherein each of the selection matrices is a matrix with a size of n×k, where n is a degree of freedom of the robot, and k is a dimension of a task selected through a selection matrix;

instructions for obtaining a null space projection matrix of each of the hierarchical subtasks based on the corresponding selection matrix;

instructions for generating control links of the first amount according to the corresponding controller of each of the hierarchical subtasks and the corresponding null space projection matrix by calling the corresponding controller in a controller library according to the controller name;

instructions for calculating a control torque of each of the control links based on the corresponding selection matrix and an expected end control parameter and a measured joint parameter of the robot, and obtaining a hierarchical control output quantity by adding the control torque of all the control links; and instructions for controlling the robot to perform the target task using the hierarchical control output quantity.

16. The non-transitory computer readable storage medium of claim 15, wherein the one or more computer programs further comprise:

instructions for calculating a dynamic compensation quantity of the robot in a Cartesian space and a dynamics compensation quantity in a joint space based on the measured joint parameter of the robot;

instructions for obtaining a total control output quantity by adding the hierarchical control output quantity, the dynamic compensation quantity, and the dynamics compensation quantity; and instructions for controlling the robot to perform the target task using the total control output quantity.

17. The non-transitory computer readable storage medium of claim 16, wherein the dynamic compensation quantity of the robot in the Cartesian space comprises a first compensation component and a second compensation component, and the measured joint parameter comprises an angular velocity of each joint of the robot and an external torque acting on the joint; wherein the instructions for calculating the dynamic compensation quantity of the robot in the Cartesian space based on the measured joint parameter of the robot comprise:

instructions for calculating the first compensation component based on the Jacobian matrix of the robot from a base to an end of the robot and the external torque acting on each joint;

instructions for calculating the second compensation component based on an inertia matrix of the robot, the Jacobian matrix, and the angular velocity of each joint; and instructions for adding the first compensation component and the second compensation component to obtain the dynamic compensation quantity.

18. The non-transitory computer readable storage medium of claim 16, wherein the dynamics compensation quantity of the robot in the joint space comprises a centrifugal force and Coriolis force item and a gravity item; wherein the centrifugal force and Coriolis force item is calculated based on an angle and an angular velocity of each joint of the robot, and the gravity item is composed of a gravity component acting on each link of the robot coupled to the joint.

19. The non-transitory computer readable storage medium of claim 15, wherein the set of task cards comprises a plurality of task cards comprising the target task card; wherein each of the task cards comprises information of a plurality of hierarchical subtasks with a priority order, the information of each of the hierarchical subtasks comprises the corresponding selection matrix for dividing the target task into the corresponding hierarchical subtask and the controller name for executing the corresponding hierarchical subtask;

wherein the hierarchical subtasks with the priority order are obtained by dividing a task to be executed according to different requirements that the task to be executed needs to meet in different directions or joints in advance; and wherein different selection matrices are configured to select a task direction of each of the hierarchical subtasks in a Cartesian space of an end of the robot.

20. The non-transitory computer readable storage medium of claim 15, wherein the instructions for obtaining the null space projection matrix of each of the hierarchical subtasks based on the corresponding selection matrix comprise:

instructions for calculating the null space projection matrix of the corresponding hierarchical subtask based on the corresponding selection matrix of the corresponding hierarchical subtask and a Jacobian matrix of the robot through equations of:

$$N_I = I - J_{I-1}^{uagT}\left(J_{I-1}^{aug\#}\right)^T, i \geq 2, N_I = I;$$

$$J_k = S_k^T J, J_I^{aug} = \begin{bmatrix} J_{i-1}^{aug} \\ J_k \end{bmatrix}; \text{ and}$$

$$J_I^{aug\#} = M^{-1} J_I^{augT}\left(J_I^{aug} B^{-1} J_i^{augT}\right)^{-1};$$

where, $N_1$ is the null space projection matrix of the i-th hierarchical subtask and i≥2, the null space projection matrix of the 1st hierarchical subtask is an identity matrix I; J is the Jacobian matrix of the robot from a base to an end of the robot; and $S_k$ and $J_k$ are the selection matrix of the k-th hierarchical subtask and the corresponding Jacobian matrix, respectively, $J_1^{avgT}$ and $J_1^{avg\#}$ are the transposition and pseudoinverse of a transition matrix $J_1^{avg}$, respectively, M is an expected mass of the robot, and B is an inertia matrix of the robot;

wherein when a number of rows of the Jacobian matrix J is less than the degree of freedom n, the Jacobian matrix J is expanded to n rows, and the expanded rows are used as a hierarchical subtask of a lowest hierarchy; and wherein in each of the selection matrices, each column vector is orthogonal to the other, and a norm of the non-zero column is 1.

* * * * *